(12) United States Patent
Rigori et al.

(10) Patent No.: US 7,191,232 B2
(45) Date of Patent: Mar. 13, 2007

(54) EXTENDABLE PROVISIONING MECHANISM FOR A SERVICE GATEWAY

(75) Inventors: Serge Andre Rigori, Proveyzieux (FR); Pierre Delisle, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 627 days.

(21) Appl. No.: 09/852,527

(22) Filed: May 9, 2001

(65) Prior Publication Data

US 2002/0069262 A1 Jun. 6, 2002

(30) Foreign Application Priority Data

Oct. 13, 2000 (EP) ................... 00402830

(51) Int. Cl.
*G06F 15/16* (2006.01)
*G06F 15/173* (2006.01)

(52) U.S. Cl. ............... 709/226; 709/219; 709/229

(58) Field of Classification Search ........ 709/217–219, 709/223–226
See application file for complete search history.

(56) References Cited

U.S. PATENT DOCUMENTS

| | | | | |
|---|---|---|---|---|
| 5,440,744 | A | * | 8/1995 | Jacobson et al. ........... 709/203 |
| 5,519,381 | A | * | 5/1996 | Marsh et al. ............. 340/10.2 |
| 5,712,903 | A | * | 1/1998 | Bartholomew et al. .. 379/88.25 |
| 5,754,939 | A | * | 5/1998 | Herz et al. ............... 455/3.04 |
| 5,787,403 | A | * | 7/1998 | Randle .................... 705/43 |
| 5,951,694 | A | | 9/1999 | Choquier et al. |
| 6,029,203 | A | * | 2/2000 | Bhatia et al. ............. 709/244 |
| 6,112,279 | A | | 8/2000 | Wang |
| 6,115,737 | A | * | 9/2000 | Ely et al. ................. 709/203 |
| 6,115,744 | A | * | 9/2000 | Robins et al. ........... 709/227 |

(Continued)

OTHER PUBLICATIONS

Chen et al., Dinamic-Agents for Dynamic Service Provisioning Aug. 22, 1998, Cooperative Information Systems, 1998. Proceedings. 3rd IFCIS International Conference on.*

(Continued)

*Primary Examiner*—David Wiley
*Assistant Examiner*—Joseph E. Avellino
(74) *Attorney, Agent, or Firm*—Meyertons Hood Kivlin Kowert & Goetzel, P.C.; Rory D. Rankin (57) ABSTRACT

A service gateway connects at least one local client to an external network. The service gateway is operable to hold at least one service module for providing a corresponding service and to maintain a record identifying each service module held by the service gateway with an associated pointer to that service module. The service gateway includes a control mechanism providing a number of functions. The control mechanism is operable in response to a request for a service provided by a service module not present at the service gateway, to send a message to an external source for resolving the absence of a service module at the gateway in one or more iterations until a response from the external service identifies information including a service module held by the gateway that enables resolution of the absent service module(s). The service gateway is thus arranged to provide an iterative, or recursive, process for repeatedly seeking a further service until the necessary software and/or data is available at the service gateway to satisfy the original service request.

29 Claims, 8 Drawing Sheets

U.S. PATENT DOCUMENTS

| | | | |
|---|---|---|---|
| 6,175,922 B1* | 1/2001 | Wang | 713/182 |
| 6,178,438 B1* | 1/2001 | Tschirhart et al. | 709/200 |
| 6,192,415 B1* | 2/2001 | Haverstock et al. | 709/245 |
| 6,301,618 B1* | 10/2001 | Sitaraman et al. | 709/227 |
| 6,360,266 B1* | 3/2002 | Pettus | 709/227 |
| 6,519,286 B1* | 2/2003 | Porter et al. | 375/240.13 |
| 6,601,086 B1* | 7/2003 | Howard et al. | 709/203 |
| 6,614,784 B1* | 9/2003 | Glitho et al. | 370/352 |
| 6,625,274 B1* | 9/2003 | Hoffpauir et al. | 379/229 |
| 6,711,157 B1* | 3/2004 | Tang et al. | 370/352 |
| 6,954,777 B1* | 10/2005 | Fields et al. | 709/203 |
| 6,993,570 B1* | 1/2006 | Irani | 709/218 |
| 2001/0039540 A1* | 11/2001 | Hofmann et al. | 707/3 |
| 2002/0062334 A1* | 5/2002 | Chen et al. | 709/200 |

OTHER PUBLICATIONS

Heskett, Sun Unveils Embedded Server 1998, News.com.*

Sun Microsystems Delivers Next Generation of Residential Gateway Server Technology for the Networked Home Oct. 10, 2000, Sun.com.*

Specification Overview, Jan. 2000, The Open Services Gateway Initiative, Version 1.0.*

Malek et al, On-Line Provisioning of Network Services, May 1998, IEEE Journal on Selected Area in Communications, vol. 6, No. 4.*

European Search Report, Application No. EP00402830.4, filed Oct. 13, 2000.

"Intermediaries: new places for producing and manipulating Web content", Barrett, et al, Computer Networks and ISDN Systems, NL, North Holland Publishing, Amsterdam, vol. 30, No. 1-7, Apr. 1, 1998, pp. 509-518.

* cited by examiner

EXTENDABLE PROVISIONING MECHANISM FOR A SERVICE GATEWAY

BACKGROUND OF THE INVENTION

The invention relates to the provision of services at a service gateway that connects an external network (e.g., the Internet) to an internal network. A service gateway provides services for local clients for supporting local client systems and devices. A service gateway can be implemented in a network connected computer system or server computer, a router, a set-top box, a power supply meter, or the like.

The local clients can include a number of devices connected within a local environment. The local environment might, for example, be the home, a workspace, a factory, a farm, a vehicle, or the like. As technology develops, those devices are more and more likely to be supported by a service provider via network links. In order to provide the support, there can be a need to provide software modules, programs, data, etc. to the local, or home environment. This can be addressed by providing the software modules, programs, data etc. at a service gateway providing an interface between the local environment and the external network.

A difficulty with this is that different configurations and needs will exist at different client sites. Typically different combinations of equipment will exist at those sites. Also, the configurations and needs will change with time, for example as new versions of software modules come into existence, in order to provide diagnostic functions in response to faults, and as the devices and other systems at the client site change.

In view of this, there is a need to be able to respond to requests that can come from the service provider side, or from the client side, for the provision of new services at the service gateway. The challenge is therefore to provide a mechanism that can enable the loading of services into the service gateway. However, at present, the development of such systems is hampered because developers do not have mechanisms that allow them readily to expand and change the way that services are provided via a service gateway. The present invention seeks to address this.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In one aspect, the invention provides a service gateway for connecting at least one local client to an external network. The service gateway is operable to hold at least one service module for providing a corresponding service. The service gateway includes a control mechanism that is operable in response to a request for a service provided by a service module not present at the service gateway, to send a message to an external source for resolving the absence of a service module at the gateway. The control mechanism is operable to send messages to an external source in one or more iterations until a response from the external service identifies information including a service module held by the gateway that enables resolution of the absence of the service modules(s).

The service gateway is thus arranged to provide an iterative or recursive process for repeatedly seeking a further service until the necessary software and/or data is available at the service gateway to satisfy the original service request.

The service gateway can be operable to hold at least one service module for providing a corresponding service and to maintain a record identifying each service module held by the service gateway with an associated pointer to that service module.

The control mechanism can, for example, operate in the following manner. The control mechanism can react to a request identifying a first service module by accessing the record to identify whether the first service module is held by the service gateway. If the first service module is held by the service gateway, it uses the associated pointer to cause the first service module to provide the corresponding service. If the first service module is not held by the service gateway, it makes a request for the first service module to an external source by sending a message to the external source including the identity of the first service module. The control mechanism further reacts to a response from the external source identifying a second service module by accessing the record to identify if the second service module is held by the service gateway. If the second service module is held by the service gateway, it uses the associated pointer to cause the second service module to provide the corresponding service. If the second service module is not held by the service gateway, it requests support from an external source by sending a message to the external source including the identity of the second service module.

The control mechanism can be further operable to react to a response from the external source identifying a further service module by accessing the record to identify if the further service module is held by the service gateway. If the further service module is held by the service gateway, it uses the associated pointer to cause the further service module to provide the corresponding service. If the further service module is not held by the service gateway, it requests support from an external source by sending a message to the external source including the identity of the further service module. It can thus be seen that this process can be operable iteratively until a further service is indeed provided by the service gateway.

The control mechanism can be operable to compare successive responses from an external source to identify response duplication indicative of a recursive error. This can be checked, for example, by tracking the service names that are looked up in the record of services.

The control mechanism can be configured to react to the identification of a service module and associated data in a response from an external source to supply the data to the identified service module, if held by the service gateway, for processing by the service module.

The external source can be a service provider for providing services to the local client. Alternatively, it can be a service gateway operator that provides functionality to the service gateway.

Another aspect of the invention provides a computer program comprising computer code operable in a service gateway computer for connecting at least one local client to an external network, the program code being operable to provide the functionality of the control mechanism described above.

A computer program can include a carrier medium to carry the computer code. The carrier medium can be a storage medium or a transmission medium, for example.

A further aspect of the invention provides a service gateway system comprising a processor and memory, the system being configured to provide a service gateway as set out above. For example, the system can include a computer program as defined above.

Another aspect of the invention provides a method of connecting at least one local client to an external network via a service gateway. The method includes a step of holding at least one service module in the service gateway for providing a corresponding service. In response to a request for a service provided by a service module not present at the service gateway, at least one message is sent in at least one iteration to an external source for resolving the absence of a service module at the gateway until a response from the external service identifies information including a service module held by the gateway that enables resolution of the absent service modules(s).

An embodiment of the invention thus provides an iterative process for obtaining support for a client served by the service gateway, whereby it is possible to update the services provided by the service gateway in a flexible and extensible manner.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described in the following with reference to the accompanying drawings.

Figure 1:
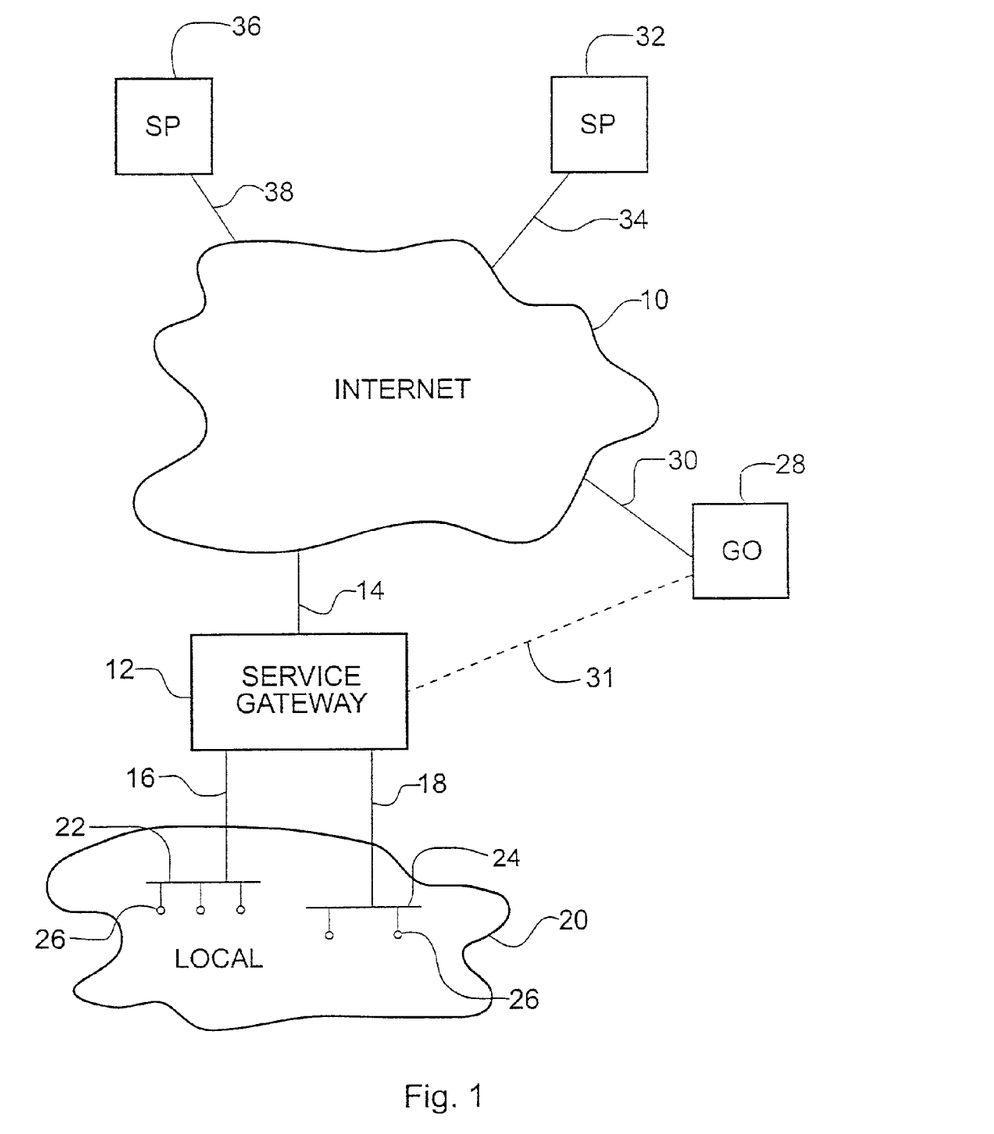
FIG. 1 is a schematic overview of a network environment including a service gateway.

FIG. 1 is a schematic representation of an implementation of an exemplary embodiment of the invention.

FIG. 1 shows an external network environment (for example the Internet) 10 to which a number of stations are connected. As shown in FIG. 1, a service gateway station 12 is connected to the Internet 10 via a connection 14 and provides an interface to a local, or home, environment 20. The service gateway station 12 as shown in FIG. 1 supports two local networks in the local environment 20. The service gateway station 12 is connected to the first local network 20 via a connection 16 and to a second local network 24 via a connection 18. In each case, a number of devices are connected to the local networks 22 and 24. The provision of two local networks is merely an example, for illustrative purposes. One or more local networks may be provided. Each of the local networks may support the same or different local protocols for servicing individual devices 26 connected to the local network(s) 22/24.

In a particular example to which the present embodiment relates, the local environment is a domestic environment in the home where a number of domestic devices are connected or connectable to the network. The devices may include complex systems such as computer systems, audio visual equipment, etc, domestic control systems such as security systems, environmental control systems, etc, and all manner of devices which previously have not been network enabled such as white goods (e.g., refrigerators, ovens and other kitchen equipment), and so on.

In other examples the local environment can include one or more of the following, namely a workplace, an office, a factory, a farm, a vehicle, an exhibition site, etc.

A service gateway operator station 28 is connected to the Internet 10 via a connection 30, and is optionally connected directly to the service gateway by a further connection (for example a telephone connection) shown as a dotted line 31. The service gateway operator station 28 is typically operated by a service gateway operator that provides information for control of the service gateway station 12 and provides services (for example as program modules) for defining the functionality of the service gateway station 12.

Two service provider stations 32 and 36 are also connected to the Internet 10 by respective connections 34 and 38. The service provider stations can typically be operated by providers of services relating to the individual devices 26 within the local environment. For example, one service provider can be a manufacturer of audio/visual devices 26 within the local environment and can provide services for supporting those devices. Another service provider can be a manufacturer of white goods forming devices 26 within the local environment 20 and can provide services for supporting those white goods. Examples of possible services are remote diagnostic services, device programming or reprogramming services, etc.

The service gateway operator station 28, and the service provider stations 32 and 36 can be configured as separate computer systems of any suitable type for holding and supplying services in the form of software modules and/or data via the Internet on request. The service gateway operator stations and/or the service provider stations can be implemented by respective web sites provided by the service gateway operator and/or the service providers and/or hosted by a third party. Accordingly, it will be appreciated that the representation of the service gateway operator station 28 and the service provider stations 32 and 36 in FIG. 1 is merely as a conceptual source of information which can, in practice, be implemented using any technology. It will be appreciated that, although one service gateway operator 28 and two service providers 32 and 36 are shown, in practice there can be more than one service gateway operator 28 and there will typically be many service providers supporting stations such as the service provider stations 32 and 36 illustrated in FIG. 1.

The service gateway station 12 can be implemented as a stand-alone computer, for example a personal computer or another form of computer workstation, or a server computer. Alternatively, it may be implemented by any other piece of network enabled equipment, for example a unit typically described as a set-top box.

Figure 2:
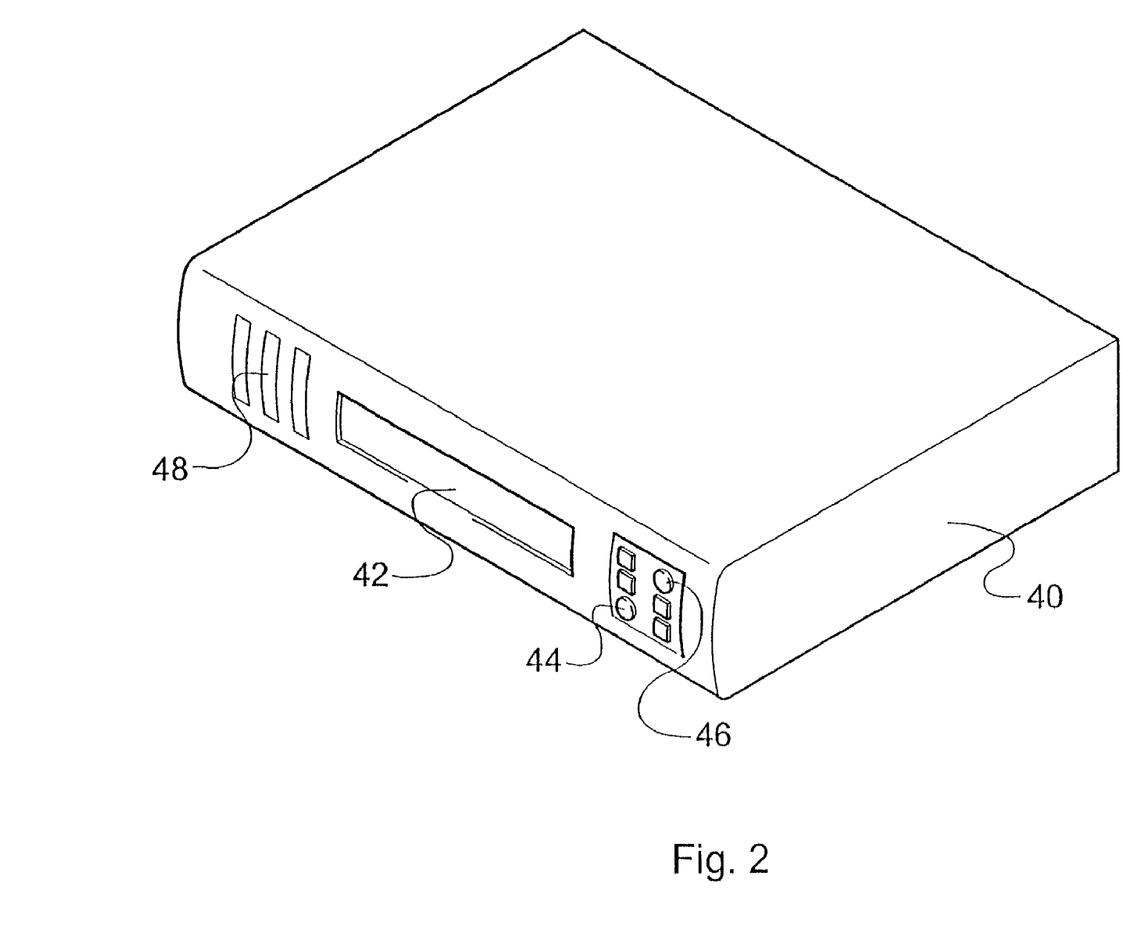
FIG. 2 is a schematic representation of an example of a service gateway system in the form of a set-top box.

FIG. 2 is a schematic representation of such a set-top box 40. As shown in FIG. 2, the set-top box 40 includes a display panel 42, input devices including key buttons 44 and a pointing device 46, and an outlet 48 for a loud speaker. The set-top box of FIG. 2 can also incorporate a microphone, can be provided with stereo speakers, can be provided with an alternate form of display, and indeed can have a completely different format. Not shown in FIG. 2, and typically located at the rear of the set-top box 40, are a number of appropriate connectors for enabling connection of the set-top box to the external and internal networks represented in FIG. 1.

Figure 3:
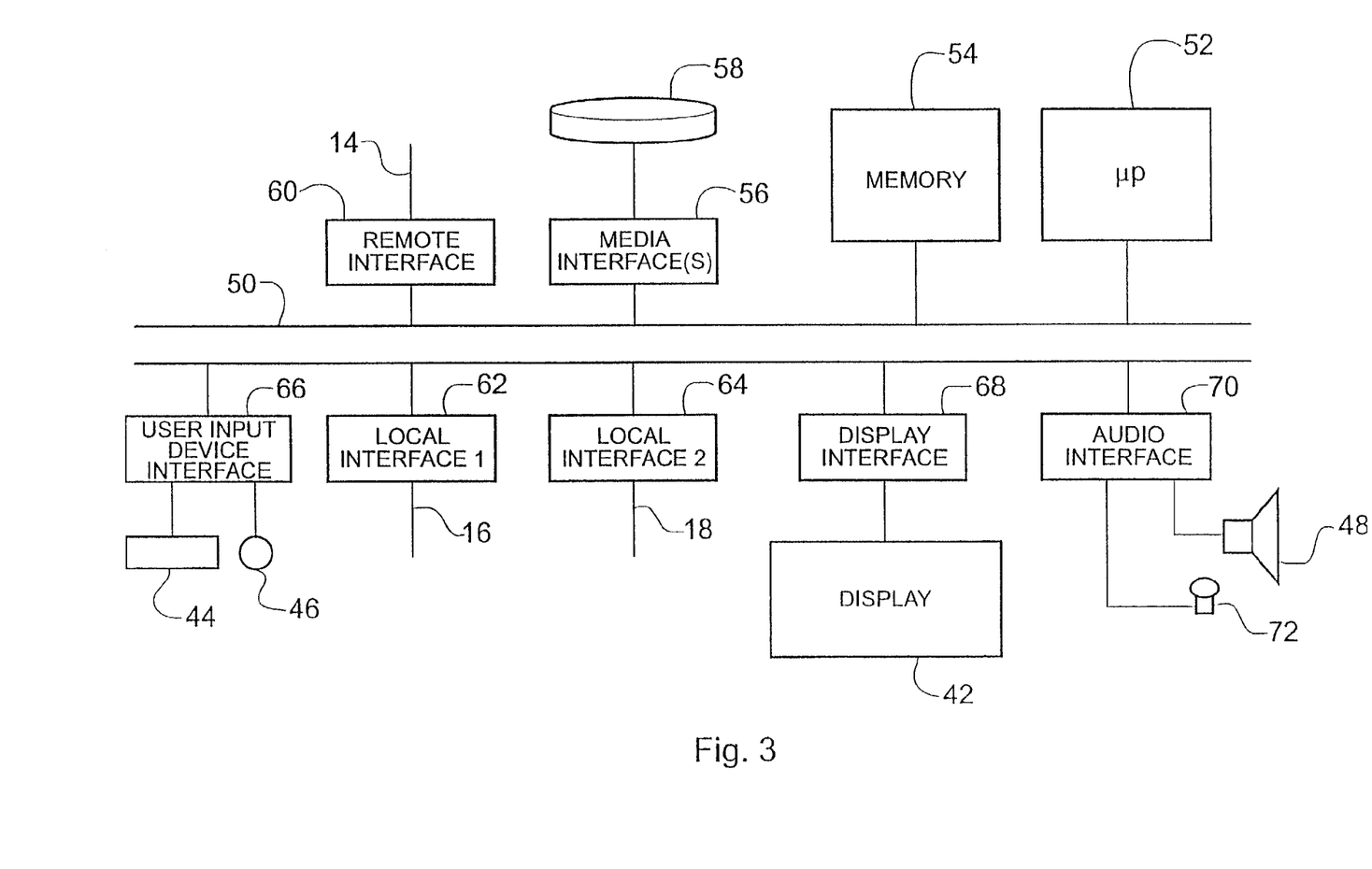
FIG. 3 is an overview of an exemplary hardware configuration of components of the service gateway.

FIG. 3 is a schematic representation of an exemplary configuration of components of the set-top box 40 of FIG. 2. Thus, as shown in FIG. 3, a number of components are connected via a bus 50. A microprocessor or microcontroller 52 is connected to the bus 50 and is able to access random access and/or read only memory 54 that is also connected to the bus 50. A media interface 56 enables the connection of a media drive 58 to the bus 50. A remote interface 60 enables the connection of the bus 50 to the external network via the connection 14. First and second local interfaces 62 and 64 enable the connection to the local networks 16 and 18. It will be appreciated that the illustration of two local interfaces 62 and 64 is by way of example only, and that there may be only one local interface, or there may be more than two local interfaces. Each local interface is arranged to support one or more local network protocols. A user input device interface 66 enables the connection of the keys 44 and the pointing device 46 to the bus 50. A display interface 68 also enables the connection of the display 42 to the bus 50. An audio interface 70 enables the connection of the loud speaker 48 to the bus 50 and optionally enables the connection of a microphone 72 to the bus 50.

It will be appreciated that the configuration shown in FIG. 3 is merely an example of a configuration of hardware components within a set-top box 40 as shown in FIG. 2. It will also be appreciated that other configurations are possible, including the incorporation of many of the separate units shown in FIG. 3 within a single large-scale integrated circuit. Other embodiments may have more than one internal bus 50 to enable different data rates to be supported efficiently between the various components of the set-top box.

It will also be appreciated that a configuration not dissimilar to that shown in FIG. 3 can form the basis of an embodiment of the service gateway implemented by means of a personal computer, or the like. In such a case the display interface 68 can support a full size computer display and the user input device interface 66 can support a conventional keyboard and mouse, or the like.

Figure 4:
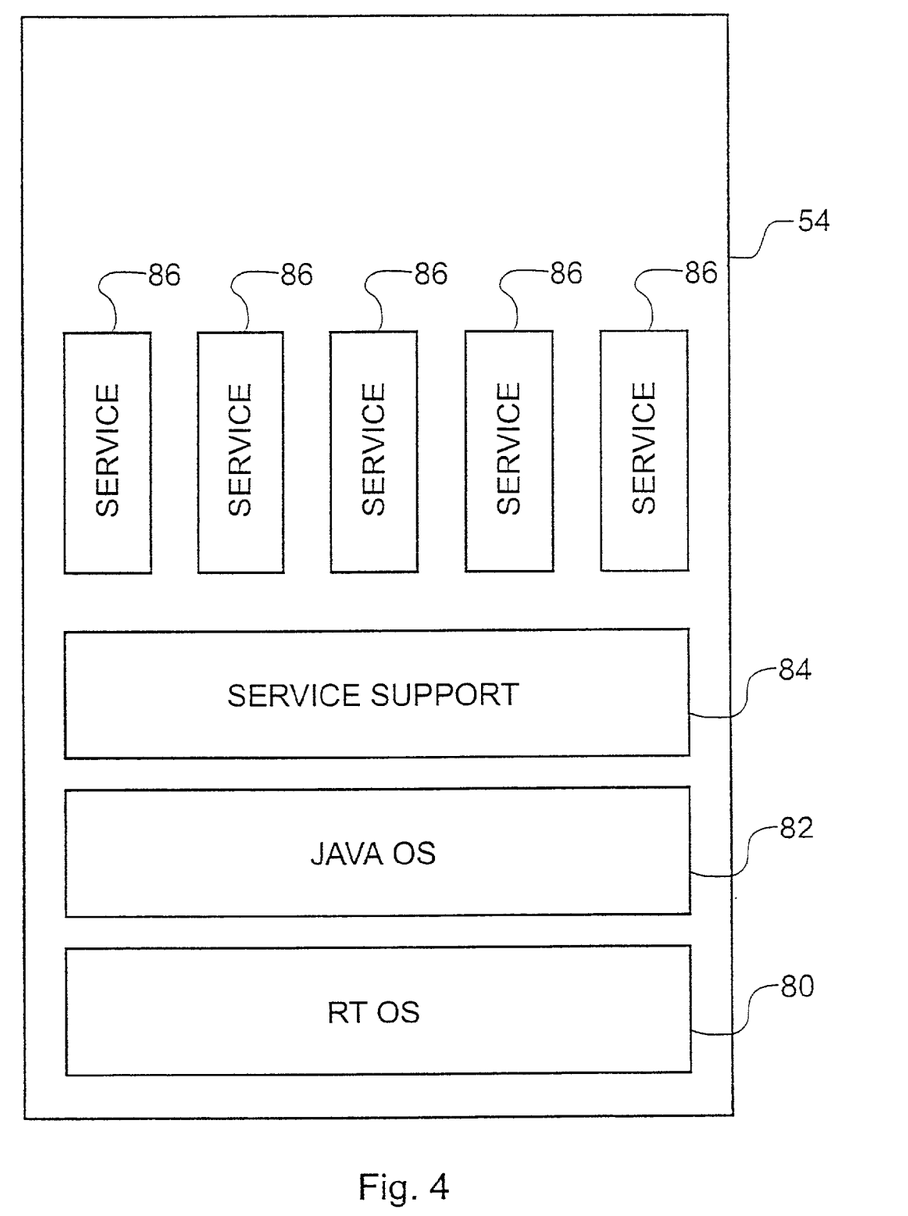
FIG. 4 is a schematic block diagram of a software environment of a services service gateway.

FIG. 4 illustrates a number of functional elements provided within the memory 54 of FIG. 3 as used for controlling the microprocessor 52. The functional elements shown in FIG. 4 are typically implemented by software modules using appropriate programming languages. In the present instance, the present example is based on a basic real time operating system 80. Supported on the real time operating system 80 is a virtual operation system environment, in this example a Java (™) virtual machine environment 82. A service support framework 84 is configured on the Java virtual machine environment 82. The service support framework 84 supports a variable number of services 86, which services are registered with the service support framework 84.

Figure 5:
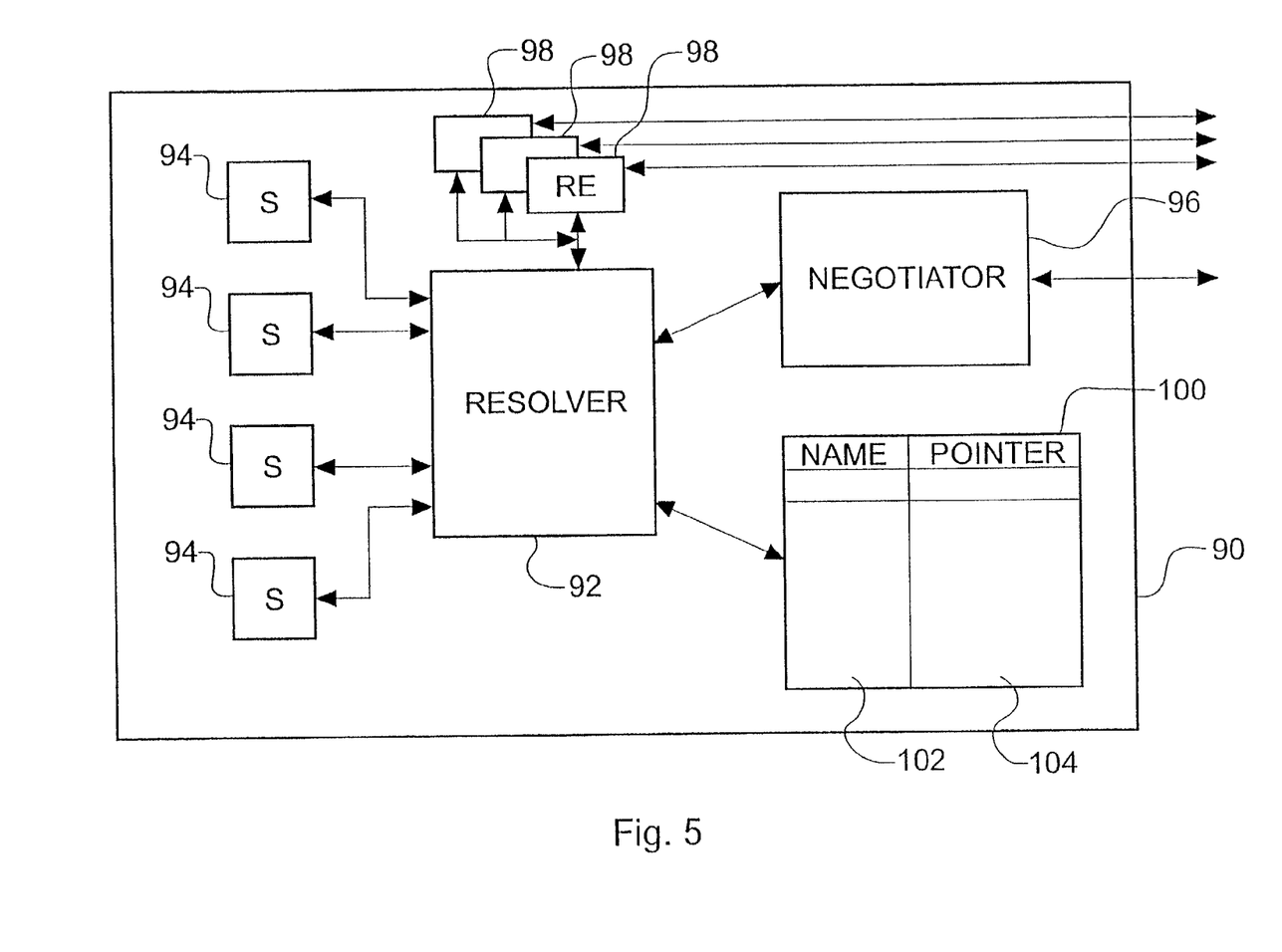
FIG. 5 is a schematic block diagram of a software components of the services service gateway.

FIG. 5 illustrates, in more detail, a number of the software components of an embodiment of a service gateway 90 according to the invention. A service resolver 92 is responsive to requests from individual services 94. A number of such services 94 are provided to support the devices 26 in the local environment 20. A service negotiator 96 is responsive to the service resolver 92 obtain information from a service provider or service gateway operator on request from the service resolver 92. A number of response engines 98 are operable to control the handling of data streams provided by a service provider or service gateway operator. The service resolver 92 refers to and maintains a local service table 100 that links service names 102 to pointers 104 to those services as supported locally. The pointers 104 point to the respective individual services 94 as held within the memory 54 of the service gateway.

It should be noted that each of the services 94, the service resolver 92, the service negotiator 96, and the response engines 98 are registered with the service support framework 84 as services 86 as represented in FIG. 4.

In a particular embodiment of the invention, the service support framework 84 is embodied using a "Java Embedded Server" (JES) product. The local services table 100 is then embodied as the JES registry, that is a registry where all JES-enabled services are registered. The Java Embedded Server (™) product is a small footprint Java (™) technology-based server for networked devices. The service support framework 84 is called a "ServiceSpace"(™) and comprises application program interfaces (APIs) for life-cycle management of plug-n-play services and applications. The service support framework 84 provides installation, versioning, content management, monitoring, and service discovery functions. Individual services can include HTTP services, SNMP services, logging, thread management, remote administration, servlet support, etc.

Further details of Java Embedded Server (™) products can be found at http://www.sun.com/software/embedded-server/overview/index.html.

An Embedded Server can provide services such as:

a Hyper Text Transfer (HTTP) service that allows client services to export their resources via the HTTP protocol;

a Log/Remote Log Service that defines a system log-like interface for logging errors and events;

a Date Service that provides a date (and time) service;

a Connection Manager Service that enables services to interact with a network, including handling socket binding, accepting connections, and unbinding all bound services when stopped by the service support framework;

a Thread Manager Service that provides thread management for the service support framework and its services;

a Scheduler Service that allows client services to schedule events for points in the future;

a Remote Method Invocation (RMI) Service that provides RMI support for bundles and maintains a single RMI registry throughout the service support framework;

a Simple Network Management Protocol (SNMP) Service that acts as an agent between local and remote SNMP entities, such as browsers;

a Console Service that provides remote administration via an applet, with the applet being exported via an HTTP or RMI service, depending on which protocol is chosen;

an HTTP-based implementation of Remote API that provides the back end of a client-server administration capability and exposes the service support framework APIs via HTTP by registering an administration servlet with the HTTP service; and an RMI-based implementation of Remote API service that provides the back end of a client-server administration capability and exposes the service support framework APIs via the RMI protocol.

The service support framework 84 manages dependency relationships between bundles. For all practical purposes, a bundle is a file that can contain any amount of code or functionality as required. A bundle can be narrowly defined and only contain a limited number of files and functionality, or it can be broadly defined and contain much more. A dependency relationship exists when one piece, or chunk of Java code relies on another piece or chunk of Java code to operate properly. However, the defining detail of a dependency relationship is that the two chunks of code must be in different bundles. For example, the JES core HTTP service is dependent on the connection manager service, because without the connection manager is cannot make HTTP connections. Where both of these services are installed in the service support framework in different bundles, there is a dependency between them. However, if the HTTP service and the connection manager service were packaged together and installed as part of the same bundle, there would be no dependency relationship.

From the above, it can be seen that the service support framework 84 of the environment shown in FIG. 4 provides a mechanism for recognizing and monitoring dependency relationships across bundles, including recognizing dependencies, tracking dependencies, making bundles that need each other to be aware of the others' availability, facilitating interactions between dependent bundles, monitoring dependencies across life-cycle events and updating dependencies when they change. An embodiment of the present invention takes advantage of the functionality provided by such a service support framework 84.

Referring once more to FIG. 5, the service gateway 90 provides an embedded subsystem in a network environment to connect an external network to internal clients. The service gateway 90 thereby provides an interface between service providers and/or a service gateway operator and local devices held on the client's local system. The service gateway thus separates the topology of the overall environment into an external network environment and an internal network environment. As mentioned above, different types of devices can support the service gateway, including a set-top box, a router, dedicated hardware, a power meter, a personal computer, etc.

As indicated also above, an embodiment of the invention provides three different types of modules in the form of a service resolver 92, a service negotiator 96 and a response engine 98, wherein there may be multiple examples of the response engine 98, with each of those entities being implemented as a service registered with the service support framework 84.

A brief exemplary summary of the operation of an embodiment of the service gateway 90 of FIG. 5 will now be described with reference to FIG. 6.

When one of the services 94, or another application operating in the local site supported by the service gateway requires another service to carry out a task, that service 94 or application calls the service resolver 92. As a parameter of the call, it is possible to specify a logical name of the service being requested.

Figure 6A:
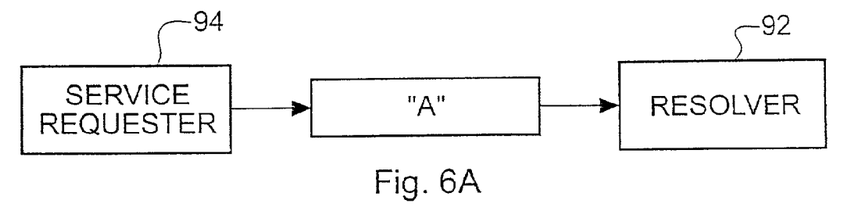
FIG. 6 illustrates a number of stages in an example of operation of an embodiment of the invention.

FIG. 6A represents a request from a requester service to the service resolver 92 for a service A.

The service resolver 92 then queries the registry 100 (where all the enabled services are registered) to see if the service name "A" is registered.

Figure 6B:
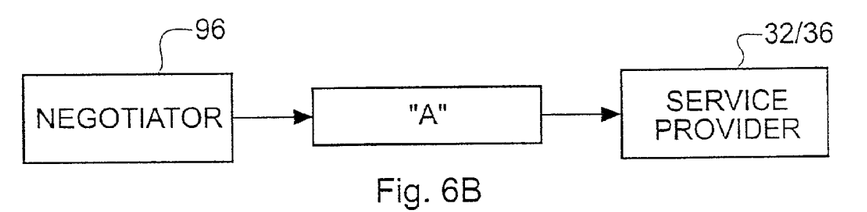

If the requested service A is found, then the service is returned to the requester. If, however, the requested service is not found, the service resolver 92 makes use of the service negotiator 96. The service negotiator 96 negotiates the requested service with the service provider by sending an HTTP GET with some additional information on the requested service. FIG. 6B represents the sending of a query (HTTP GET) with the requested service name "A".

Figure 6C:
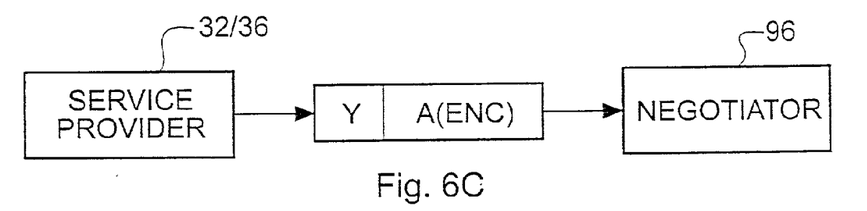

The service negotiator 96 returns to the service resolver a service name and an input stream that is provided by the service provider. The input stream forms a payload for the response. FIG. 6C represents the return of a response from the service provider with a proposed service Y that includes an encoded version of the requested service A A(ENC) as an input stream. Y is the name of the service needed to decode the encoded service A.

The service name can be explicitly provided using a dedicated HTTP header field. The header field can also identify the format of the input stream to be received. If available, the service resolver 92 retrieves the service specified in the response from the service negotiator 96.

The service resolver 92 then employs a response engine 98 appropriate for the protocol of the received information to manage the transfer of the input stream to the identified service.

This is an interactive process. That is to say, if the service having the name specified in the response from the service provider is not locally available in the service gateway 90, the service resolver 92 will once again make use of the service negotiator to obtain a further service for resolving this matter.

Figure 6D:
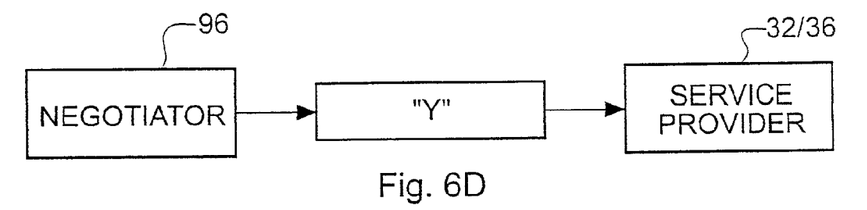

For example, if it assumed that the service gateway does not have the service Y for decoding the encoded version of the service A, then a further request can sent to the service provider specifying the service name Y as represented in FIG. 6D.

Figure 6E:
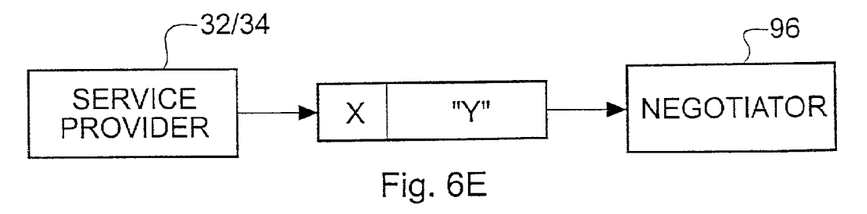

The service provider can then respond by specifying a service X with the code for the service Y as an input stream as represented in FIG. 6E. The service X can be the service name for a Zip function for unzipping a zipped up version of the code for the service Y. Let us assume that the unzip service is held by the service gateway.

The service gateway can then operate to use the service X (the unzip service) to unzip the code for the service Y. The service Y can then be used to decode the service A, whereby the service A can then be provided at the service gateway.

It can be seen from this example that an embodiment of the invention can provide a flexible and extensible approach to the provisioning of services at a local service gateway. It can also be seen from this specific example that an embodiment of the invention can provide for the secure communication of software and/or data from a service provider to a service gateway for secure provisioning of services at the service gateway.

The individual functions of the service resolver 92, the service negotiator 96 and the response engine 98 will now be explained in more detail below.

Service Resolver 92

The service resolver 92 provides a central point of contact for service provisioning in the service gateway. The service resolver 92 is responsible for installing and activating bundles associated with a service description. If a service is not already registered with the service support framework 90 (i.e., its name is not held in the registry 100), then the service resolver 92 is responsible for organizing contact with the service provider or service gateway operator to provision an appropriate service bundle. In order to do this, the service resolver 92 makes use of the service negotiator 96, as described below, in order to obtain instructions from the remote service provider or service gateway operator. It then hands over received instructions to a response engine, as also described below, to process the provisioning instruction. Once an instruction is executed, the resolver queries the service support framework to check if the service is now available.

A summary of a method for providing the service resolver is set out in Table 1 below:

TABLE 1

Method Summary

| | |
|---|---|
| com.sun.servicespace.BundleContext | getService(java.net.URL url, com.sun.servicespace.ServiceDescription sd) Get the service associated to the given service description |

More detail of the method or the resolver service is set out in Table 2 as follows:

TABLE 2 getService (java.net.URL url,
    com.sun.servicespace.ServiceDescription
  throws java.io.IOException,
    com.sun.servicespace.BundleException
    Get the service associated to the given service description. If the requested service is found, the caller can access the service by calling:
    servicespace.getService(BundleContext, ServiceDescription)
Note that such a call creates a dynamic dependency between the caller and the service. That is why the method does not return a reference on the requested service.
Parameters: url - An optional URL where to query if the service is not found locally.
    sd - The service description of the service to be found.
Returns:
A BundleContext instance, or null if the service could not be found.

Service Negotiator 96

The service negotiator 96 is responsible for communicating with an external service provider or service gateway operator. The service negotiator 96 is called by the service resolver 92 if the service resolver 92 needs to find services not currently registered with the service support framework 84.

The service negotiator 96 can be called to invoke services at the service provider or service gateway operator. The service negotiator 96 sends a request to a server for the service provider or service gateway operator. When it receives a response it tries to identify a proper response engine from information in the response header in order to be able to process the response. A response engine as described below is identified by a service description.

The service negotiator 96 is operable to handle communication with the service provider, whereby services supported by the service gateway are not impacted by changes to the communication scheme used for communication with the service provider.

The service negotiator 96 invokes a service provider using either a URL specified in a call to an HTML anchor or a predefined URL.

The service negotiator 96 sends a response to a service provider and identifies a response engine able to handle the response. It then returns an instruction to the service resolver.

The service negotiator 96 expects a response engine to be specified by a specific HTTP header and can be configured using a specific instruction. By default, a header name is "engine".

If no header is present, the service negotiator 96 uses a MIME type of the content that a service provider indicates should be used. For example, the mind types "text/plain" and "text/html" can be supported.

A summary of the method providing a negotiator service is set out in Table 3 below:

TABLE 3

Method Summary

| | |
|---|---|
| java.lang.String | getServiceProvider () Returns the service provider the negotiator is dealing with |
| NegotiatorService.Instruction | sendRequest (java.net.URL url, java.lang.String requestName, java.util.Properties requestParams) Query the service provider. |

More detail of the methods in the method summary are set out in Table 4 below:

TABLE 4

SendRequest
Public NegotiatorService.Instruction sendRequest (java.net.URL url,
    java.lang.String requestName,
    java.util.Properties requestParams)
  throws java.io.IOException
  Query the service provider.

TABLE 4-continued

If the URL is not specified, the service will use the default one (returned by getServiceProvider.
    Parameters:
        url - A URL where to send the request. If not specified, the negotiator will use a predefined one.
        requestName - The name of the service to be invoked.
        requestParams - The parameters for invoking the service
    Returns:
        An Instruction instance
GetService Provider
public java.lang.String getServiceProvider ()
    Returns the service provider the negotiator is dealing with.

Response Engine 98

As indicated above, a response engine 98 is responsible for processing an input stream received by a service negotiator. The response engine for processing a response received from a service provider is selected by the service negotiator 96 using the header of the response, as described above. The selected response engine receives an input stream to process. The appropriate choice of response engine enables the service provider and the response engine concerned to agree on the structure of the input stream.

A summary of the method provided by a response engine is set out in Table 5 below.

TABLE 5

Method Summary

| | |
|---|---|
| java.lang.Object | processResponse (java.net.URL url, java.io.InputStream resource) Handle an input stream received by a negotiator service. |

More detail of the method is set out in Table 6 below:

TABLE 6

Figure 7A:
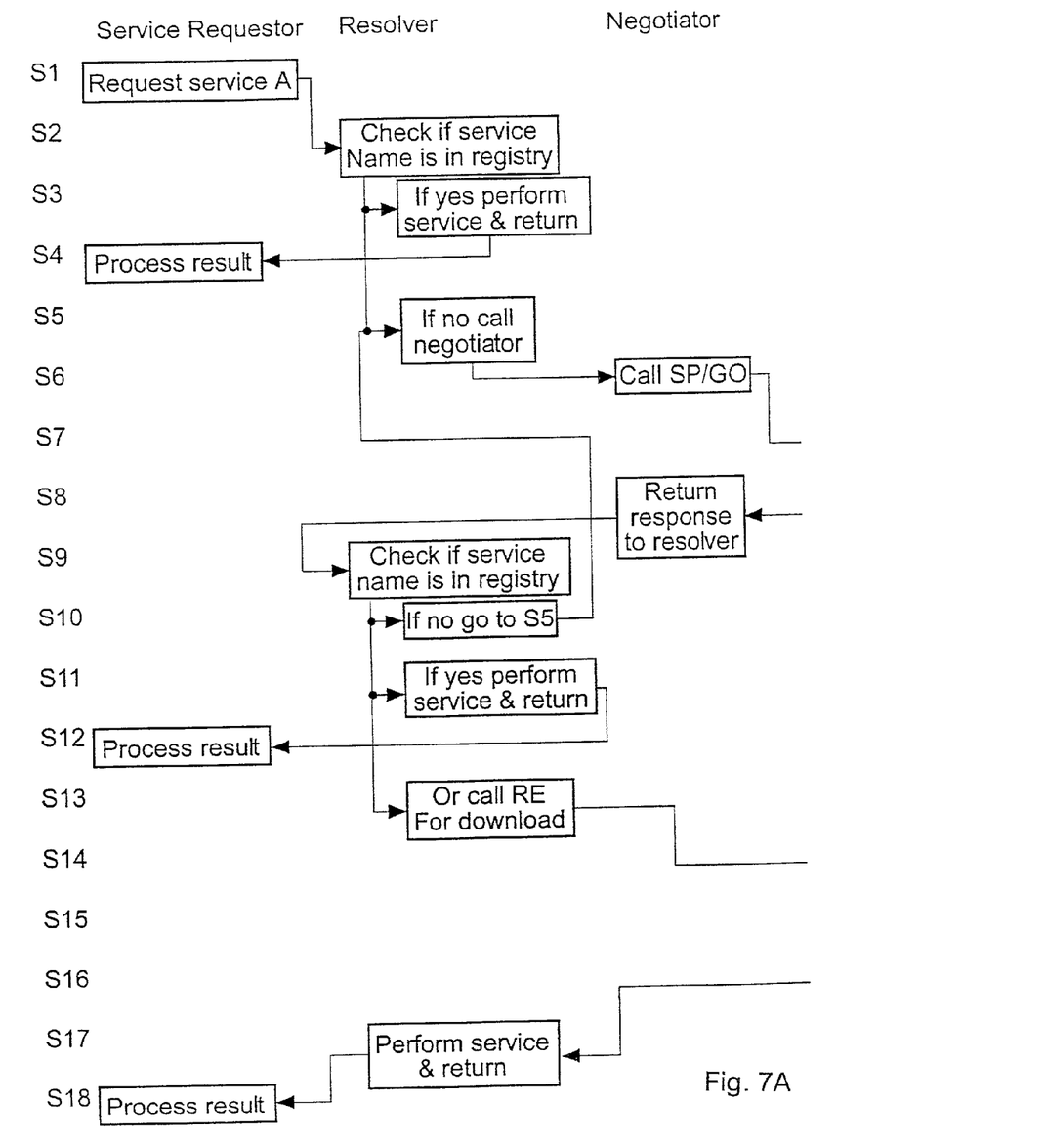
FIG. 7 is a flow diagram illustrating an example of operation of an embodiment of a service gateway according to the invention.
Figure 7B:
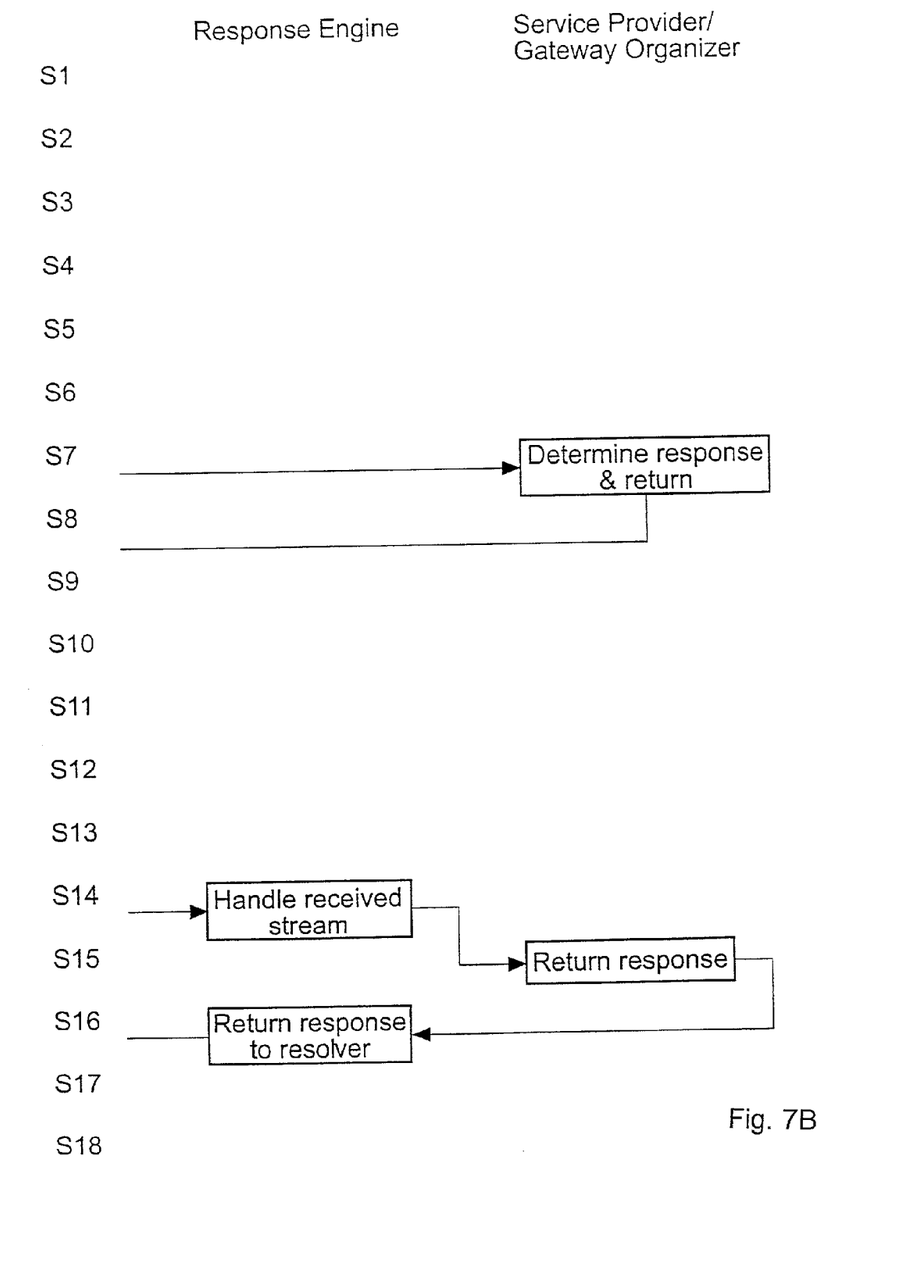

ProcessResponse
Public java.lang.Object processResponse (java.net.URL url,
        java.io.InputStream resource)
        throws com.sun.servicespace.BundleException,
        java.io.IOException
    Handle an input stream received by a negotiator service.
    Parameters:
        resource - the InputStream FIG. 7 is a flow diagram illustrating the operation of the various services as described above.

In this example, it is assumed that a service registered with the service support framework (hereinafter service requester) requests a service A. Accordingly, in step S1, the service requester issues a request for service A to the service resolver 92. In step S2, the service resolver 92 checks whether the service name is held in the registry 100.

In step S3, if the service name is held in the registry 100, the service resolver 92 is operable to return the pointer to that service to the service requester 94, which is then operable to process call that service in step S4.

If, in step S2, it is determined that the service name is not held in the registry 100, then in step S5, the service resolver 92 issues a call to the service negotiator 96 to request that the service negotiator 96 obtains the service from an appropriate service provider, or the service gateway operator. Accordingly, in step S6, the service negotiator sends a call to an appropriate service provider or service gateway operator.

The service negotiator is configured by the gateway operator. In addition, it is possible for a service requester to query the service resolver with a specific URL, by passing the default configuration to the service negotiator.

In step S7, the service provider or service gateway operator is operable to process the call from the negotiator service, and to return an appropriate response relating to the requested service. In step S8, the service negotiator 96 is operable to receive the response and to forward this to the service resolver 92.

In step S9, the service resolver is operable to check whether a service name in the response provided from the service provider or service gateway operator via the service negotiator is held in the registry 100.

If it is not held in the registry 100, then in step S10, control passes back to step S5, where a further call is made to obtain a further service to resolve the outstanding issues. This loop can continue until it is determined in step S9 that the required service is registered in the service registry 100.

If the service name concerned is registered in the service registry 100 and no further information is required, then in step S11, the pointer to the service is returned to the service requester which, in step S12, then calls the service to process the result.

Alternatively, if it is determined in step S9 that the service is in the registry and, additionally, it is necessary to obtain a download of an input stream from the service provider, the resolver service then calls in step S13 an appropriate response engine 98 to process the input stream.

The identification of an appropriate response engine 98 is made by the service negotiator 96 on the basis of the header of the response, if specified, and/or on the format of the response. Once the appropriate response engine is identified, the service negotiator builds an instruction for the service provider to execute. The instruction contains a logical name and the input stream to pass over to the identified response engine.

The response engine 98 selected is operable in step S14 to handle the received input stream, including, where appropriate, requesting that input stream from the service provider or service gateway operator.

In this case, the service provider or service gateway operator is responsive to the response engine to return in step S15 the input stream required. The response engine is operable in step S16 to process the received input stream and to return this to the service resolver 92 which forwards the appropriate input stream to the service requester in step S17.

The service requester is then operable in step S18 to process the received information.

There has been described, therefore, a service gateway that connects at least one local client to an external network. The service gateway is operable to hold at least one service module for providing a corresponding service and to maintain a record identifying each service module held by the service gateway with an associated pointer to that service module. The service gateway includes a control mechanism providing a number of functions. The control mechanism is operable in response to a request for a service provided by a service module not present at the service gateway, to send a message to an external source for resolving the absence of a service module at the gateway in one or more iterations until a response from the external service identifies information including a service module held by the gateway that enables resolution of the absent service modules(s). The service gateway is thus arranged to provide an iterative, or recursive, process for repeatedly seeking a further service until the necessary software and/or data is available at the service gateway to satisfy the original service request.

The resolver, the negotiator and the response engines are configured as software services registered with the service gateway. These services can be provided as computer programs on a carrier medium. The carrier medium can be a storage medium (such as an optical, a magneto-optical, a magnetic or a solid state storage medium configured as a disk, tape or solid state device, etc), or a transmission medium (such as a telephonic, wireless, copper, optical or other wired medium, etc), or a mixture thereof, as appropriate.

Although particular embodiments of the invention have been described, it will be appreciated that many modifications/additions and/or substitutions may be made within the scope of the invention.

The invention claimed is:

1. A service gateway operable to
(i) connect at least one local client to an external network; and
(ii) hold at least one service module for providing a corresponding service, wherein the service gateway includes a control mechanism configured to respond to a request for a first service provided by a service module not present at the service gateway by sending one or more messages to an external source until a response from the external source identifies a first service module within the gateway that is capable of providing the first service;
wherein the response received from the external source identifies a proposed service and includes an input stream comprising an encoded version of the first service module, wherein the proposed service is a service required to decode the encoded version of the first service module;
wherein the service gateway further comprises a record that identifies service modules that are held by the service gateway, the record including a pointer to each of the service modules, wherein the control mechanism is operable to react to a received request that identifies a first service module by:
accessing the record to determine if the first service module is held by the service gateway;
using the associated pointer included in the record to cause the first service module to provide a corresponding service if the first service module is held by the service gateway; and
if the first service module is not held by the service gateway, recursively requesting support from an external source until the record indicates that the first service module is held by the service gateway;
wherein requesting support from an external source comprises:
sending a message to the external source until a response from the external source identifies a first service module; and
reacting to a response from the external source that includes an input stream comprising an encoded version of the first service module and identifies a second service module, wherein the second service module is required to decode the encoded version of the first service module by:
if the second service module is held by the service gateway, decoding the first service module; and
if the second service module is not held by the service gateway:
requesting support from the external source until a response from the external source identifies a second service module that is held by the service gateway.

2. The service gateway of claim 1, wherein the control mechanism is operable to:
react to a response from the external source that identifies a further service module by accessing the record to identify if the further service module is held by the service gateway and:
using the associated pointer included in the record to cause the further service module to provide the corresponding service if the further service module is held by the service gateway; and
requesting support from an external source by sending a message to the external source that includes an identification of the further service module if the further service module is not held by the service gateway.

3. The service gateway of claim 1, wherein the control mechanism is operable to compare successive responses from an external source to identify response duplication indicative of a recursive error.

4. The service gateway of claim 1,
wherein the control mechanism reacts to the identification of a service module and associated data in a response from an external source by supplying the associated data to the identified service module, if held by the service gateway, for processing by the service module.

5. The service gateway of claim 1, wherein an external source is a service provider.

6. The service gateway of claim 1, wherein an external source is a service gateway operator.

7. The service gateway of claim 1, wherein the control mechanism comprises service provisioning mechanism which includes at least:
a resolver responsive to a request from a requestor for a service to determine whether a requested service is provided by the service gateway;
a negotiator responsive to an indication from the resolver that a requested service is not provided by the service gateway to query an external source for identifying a further service for attempting to satisfy the service request; and
at least one response engine for processing information provided by the external source in response to the negotiator query;
wherein the negotiator is configured to interrogate the response received from the external source to attempt to identify a message protocol for the response, whereby the response engine selected is a response engine configured to process a message formatted in the identified protocol.

8. The service gateway of claim 7, including a record identifying a service module for performing a service provided at the service gateway.

9. The service gateway of claim 7, wherein the resolver is operable to respond to a request for a service by interrogating a service record to determine if the service is provided by the service gateway; and
  if said service is provided by the service gateway, to identify to the requestor a service module for performing the service; and
  if said service is not provided by the service gateway, to call the negotiator for querying an external source for the identity of a further service to attempt to satisfy the service request.

10. The service gateway of claim 7, wherein the negotiator is responsive to a call from the resolver to identify and query an external source for the identity of a further service to attempt to satisfy the service request.

11. The service gateway of claim 7,
  wherein the service provisioning mechanism is operable within a support framework with each of the resolver, the negotiator and the response engine being services registered with the framework.

12. A computer program comprising program code on a storage medium, operable in a service gateway computer, the service gateway computer being operable to connect at least one local client to an external network, the program code being operable:
  to support at least one service module at the service gateway for providing a corresponding service; and
  to respond to a request for a first service provided by a service module not present at the service gateway by sending one or more messages to an external source until a response from the external source identifies a first service module within the gateway that is capable of providing the first service;
  wherein the response received from the external source identifies a proposed service and includes an input stream comprising an encoded version of the first service module, wherein the proposed service is a service required to decode the encoded version of the first service module;
  maintain a record that identifies each service module held by the service gateway, the record including an associated pointer to each of the service modules; react to a received request that identifies a first service module by:
    accessing the record to determine if the first service module is held by the service gateway;
    using the associated pointer included in the record to cause the first service module to provide a corresponding service if the first service module is held by the service gateway; and
    if the first service module is not held by the service gateway, recursively requesting support from an external source until the record indicates that the first service module is held by the service gateway;
    wherein requesting support from an external source comprises: sending a message to the external source until a response from the external source identifies a first service module; and
    reacting to a response from the external source that includes an input stream comprising an encoded version of the first service module and identifies a second service module wherein the second service module is required to decode the encoded version of the first service module by:
      if the second service module is held by the service gateway, decoding the first service module; and
      if the second service module is not held by the service gateway:
    requesting support from the external source until a response from the external source identifies a second service module that is held by the service gateway.

13. The computer program of claim 12, wherein the program code is operable to:
  react to a response from the external source that identifies a further service module by accessing the record to identify if the further service module is held by the service gateway and:
    using the associated pointer included in the record to cause the further service module to provide the corresponding service if the further service module is held by the service gateway; and
    requesting support from an external source by sending a message to the external source that includes an identification of the further service module if the further service module is not held by the service gateway.

14. The computer program of claim 12, wherein the control mechanism is operable to compare successive responses from an external source to identify response duplication indicative of a recursive error.

15. The computer program of claim 12,
  wherein the computer code reacts to the identification of a service module and associated data in a response from an external source by supplying the associated data to the identified service module, if held by the service gateway, for processing by the service module.

16. The computer program of claim 12, wherein an external source is a service provider.

17. The computer program of claim 12, wherein an external source is a service gateway operator.

18. The computer program product of claim 12, wherein the computer code is operable to provide:
  a resolver service responsive to a request from a requestor for a service to determine whether a requested service is provided by the service gateway;
  a negotiator service responsive to an indication from the resolver service that a requested service is not provided by the service gateway to query an external source for the identity of a further service to attempt to satisfy the service request; and
  at least one response engine for processing information provided by the external source in response to the negotiator service query;
  wherein the negotiator is configured to interrogate the response received from the external source to attempt to identify a message protocol for the response, whereby the response engine selected is a response engine configured to process a message formatted in the identified protocol.

19. The computer program product of claim 12, wherein the record is a registry of services registered at the service gateway.

20. A method of servicing at least one local client connected to an external network via a service gateway, the method comprising:
  holding at least one service module at the gateway for providing a corresponding service;
  responding to a request for a first service provided by a service module not present at the service gateway by sending one or more messages to an external source until a response from the external source identifies a first service module within the gateway that is capable of providing the first service;

wherein the response received from the external source identifies a proposed service and includes an input stream comprising an encoded version of the first service module, wherein the proposed service is a service required to decode the encoded version of the first service module;

maintaining a record in the service gateway that identifies each service module held by the service gateway, the record including an associated pointer to each of the service modules;

reacting to a request that identifies a first service module by:

accessing the record to determine if the first service module is held by the service gateway;

using the associated pointer included in the record to cause the first service module to provide a corresponding service if the first service module is held by the service gateway; and if the first service module is not held by the service gateway, recursively requesting support from an external source until the record indicates that the first service module is held by the service gateway;

wherein requesting support from an external source comprises:

sending a message to the external source until a response from the external source identifies a first service module; and reacting to a response from the external source that includes an input stream comprising an encoded version of the first service module and identifies a second service module, wherein the second service module is required to decode the encoded version of the first service module by:

if the second service module is held by the service gateway, decoding the first service module; and if the second service module is not held by the service gateway:

requesting support from the external source until a response from the external source identifies a second service module that is held by the service gateway.

21. The method of claim 20, further comprising:

reacting to a response from an external source that identifies a further service module by accessing the record to identify if the further service module is held by the service gateway and:

using the associated pointer to cause the further service module to provide the corresponding service if the further service module is held by the service gateway; and requesting support from an external source by sending a message to the external source that includes an identification of the further service module if the further service module is not held by the service gateway.

22. The method of claim 20, further comprising comparing successive responses from an external source to identify response duplication indicative of a recursive error.

23. The method of claim 20, further comprising reacting to the identification of a service module and associated data in a response from an external source by supplying the associated data to the identified service module, if held by the service gateway, for processing by the service module.

24. The method of claim 20, further comprising requesting support from an external service provider if a given service module is not held by the service gateway.

25. The method of claim 20, further comprising requesting support from an external service gateway operator if a given service module is not held by the service gateway.

26. The method of claim 20, further comprising:

a) responding to a request from a requestor for a service to determine whether a requested service is provided by the service gateway;

b) where a requested service is not provided by the service gateway, querying an external source for identifying a further service for attempting to satisfy the service request; and c) processing information provided by the external source in response to the query; and d) interrogating the response received from the external source to attempt to identify a message protocol for the response, whereby the response engine selected is a response engine configured to process a message formatted in the identified protocol.

27. The method of claim 26, further comprising recursively repeating steps (a), (b) and (c) until a service is found that is supported by the service gateway.

28. The method of claim 26, wherein step (a) includes interrogating a service record to determine if a service is provided by the service gateway;

if said service is provided by the service gateway, identifying to a requestor a service module for performing the service; and if said service is not provided by the service gateway, passing to step (b).

29. The method of claim 26, wherein step (b) includes identifying and querying an external source for the identity of a further service to attempt to satisfy the service request.

* * * * *